(12) United States Patent
Kim et al.

(10) Patent No.: US 11,080,953 B2
(45) Date of Patent: Aug. 3, 2021

(54) METHOD, SYSTEM, AND DOOR LOCK DEVICE FOR CONTROLLING DOOR LOCK

(71) Applicants: LINKELECTRONICS CO., LTD, Anyang-si (KR); Youngsoo Kim, Goyang-si (KR); Deokheon Kim, Seoul (KR)

(72) Inventors: Youngsoo Kim, Goyang-si (KR); Deokheon Kim, Seoul (KR)

(73) Assignees: LINKELECTRONICS CO., LTD., Anyang-si (KR); Youngsoo Kim, Goyang-si (KR); Deokheon Kim, Seoul (KR)

( * ) Notice: Subject to any disclaimer, the term of this patent is extended or adjusted under 35 U.S.C. 154(b) by 0 days.

(21) Appl. No.: 16/640,278

(22) PCT Filed: Jul. 24, 2018

(86) PCT No.: PCT/KR2018/008376
§ 371 (c)(1),
(2) Date: Feb. 19, 2020

(87) PCT Pub. No.: WO2019/039746
PCT Pub. Date: Feb. 28, 2019

(65) Prior Publication Data
US 2021/0082214 A1    Mar. 18, 2021

(30) Foreign Application Priority Data
Aug. 22, 2017  (KR) .................. 10-2017-0106312

(51) Int. Cl.
*G07C 9/00*       (2020.01)
*H04B 17/318*   (2015.01)
(Continued)

(52) U.S. Cl.
CPC ...... *G07C 9/00309* (2013.01); *E05B 47/0001* (2013.01); *G07C 9/00563* (2013.01);
(Continued)

(58) Field of Classification Search
CPC ............ G07C 9/00309; G07C 9/00571; G07C 9/00563; G07C 2009/00412;
(Continued)

(56) References Cited

U.S. PATENT DOCUMENTS 7,046,119 B2 *  5/2006  Ghabra ................. B60R 25/245
                                                                  340/5.61
8,060,150 B2 * 11/2011  Mendenhall ...... H04M 1/72463
                                                                  455/569.2

(Continued)

FOREIGN PATENT DOCUMENTS

JP     2017-117182 A    6/2017
KR  10-2014-0112786 A  9/2014
(Continued)

OTHER PUBLICATIONS

International Search Report for PCT/KR2018/008376 dated Nov. 16, 2018 from Korean Intellectual Property Office.

*Primary Examiner* — Nam V Nguyen
(74) *Attorney, Agent, or Firm* — Paratus Law Group, PLLC

(57) ABSTRACT

A method for controlling a door lock device includes checking whether strength of a scanned signal obtained by scanning a signal output from a smart phone is greater than predetermined strength of a signal by the door lock device; comparing strength of a signal (RSSI) of the smart phone received through an external antenna installed outside the door in which the door lock device is installed with the RSSI received through an internal antenna installed inside the door by the door lock device; authenticating whether the (Continued)

smart phone is a valid smart phone, when the strength of a signal of the smart phone received through the external antenna is greater than the strength of a signal of the smart phone received through the internal antenna by a predetermined value; and opening the door when the smart phone is authenticated as the valid smart phone according to the authenticated result.

6 Claims, 4 Drawing Sheets

(51) Int. Cl.
*H04W 4/80* (2018.01)
*H04W 12/06* (2021.01)
*E05B 47/00* (2006.01)
*H01Q 1/24* (2006.01)
*H01Q 1/38* (2006.01)

(52) U.S. Cl.
CPC ........... *G07C 9/00571* (2013.01); *H01Q 1/24* (2013.01); *H01Q 1/38* (2013.01); *H04B 17/318* (2015.01); *H04W 4/80* (2018.02); *H04W 12/068* (2021.01); *E05B 2047/0054* (2013.01); *E05B 2047/0071* (2013.01); *G07C 2009/00412* (2013.01)

(58) Field of Classification Search
CPC ... H04W 12/068; H04W 4/80; E05B 47/0001; E05B 2047/0054; E05B 2047/0071; H01Q 1/38; H01Q 1/24; H04B 17/318
USPC .......................................... 340/5.61, 5.7, 5.8
See application file for complete search history.

(56) References Cited

U.S. PATENT DOCUMENTS

| | | | | |
|---|---|---|---|---|
| 8,427,289 | B2* | 4/2013 | Ghabra | B60R 25/24 340/426.36 |
| 8,744,482 | B2* | 6/2014 | Margalef | H04Q 9/00 455/456.1 |
| 9,652,917 | B2* | 5/2017 | Johnson | E05B 47/00 |
| 9,875,589 | B1* | 1/2018 | Buttolo | G07C 9/00571 |
| 9,875,591 | B2* | 1/2018 | Watters | H04W 4/80 |
| 9,894,492 | B1* | 2/2018 | Elangovan | H04W 4/023 |
| 10,507,797 | B2* | 12/2019 | Ziller | G07C 9/00309 |
| 10,586,413 | B2* | 3/2020 | Kim | H04B 17/327 |
| 2008/0048909 | A1* | 2/2008 | Ioffe | B60R 25/00 342/357.31 |
| 2018/0339676 | A1* | 11/2018 | Lazarini | G07C 9/00309 |
| 2019/0090093 | A1* | 3/2019 | Odejerte, Jr. | H04W 4/80 |
| 2019/0130682 | A1* | 5/2019 | Farges | G07C 9/00309 |

FOREIGN PATENT DOCUMENTS

| | | |
|---|---|---|
| KR | 10-2015-0141375 A | 12/2015 |
| KR | 10-2017-0009532 A | 1/2017 |
| KR | 10-2017-0086723 A | 7/2017 |

* cited by examiner

FIG. 3
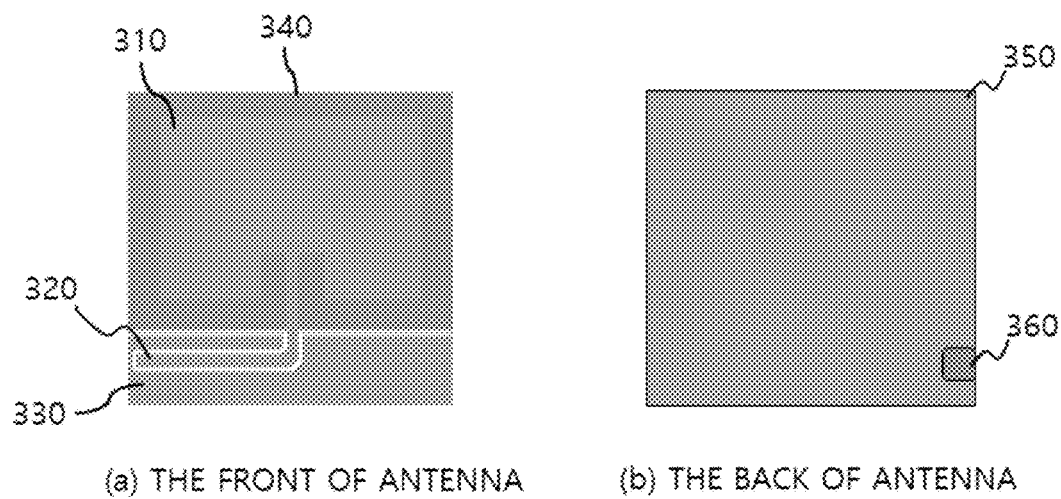
(a) THE FRONT OF ANTENNA    (b) THE BACK OF ANTENNA
FG. 4
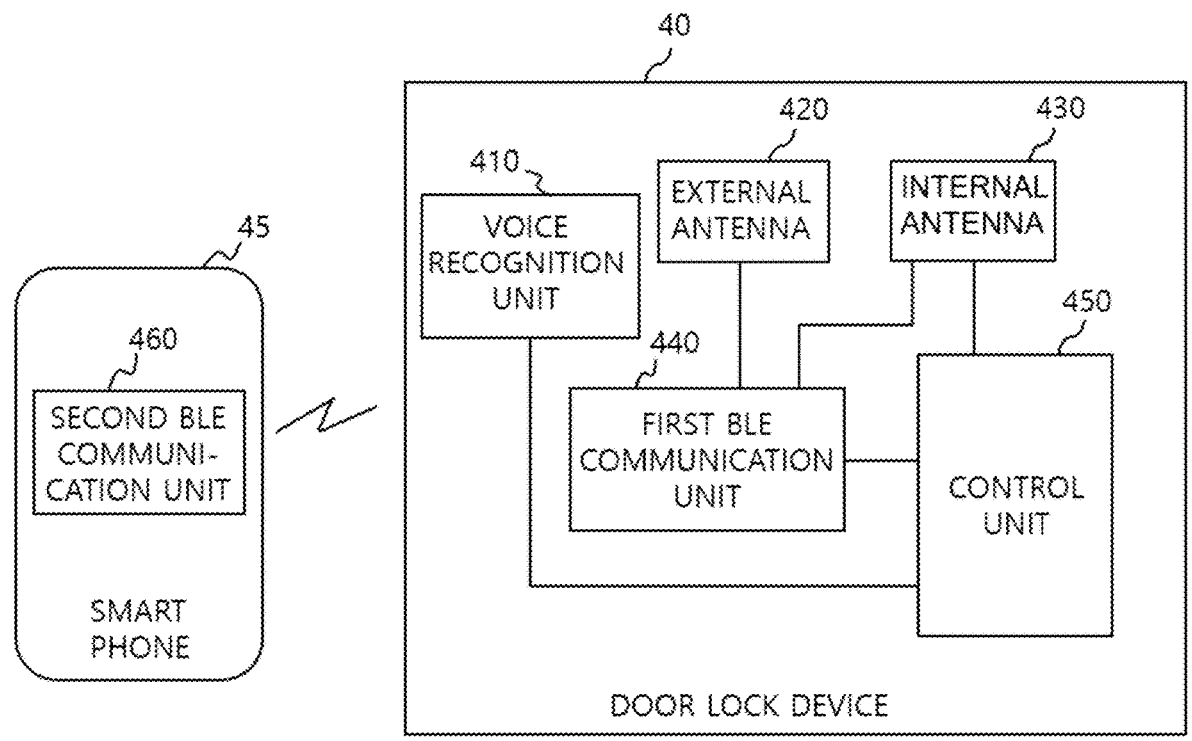

METHOD, SYSTEM, AND DOOR LOCK DEVICE FOR CONTROLLING DOOR LOCK

CROSS-REFERENCE TO PRIOR APPLICATIONS

This application is a National Stage Patent Application of PCT International Patent Application No. PCT/KR2018/008376 (filed on Jul. 24, 2018) under 35 U.S.C. § 371, which claims priority to Korean Patent Application No. 10-2017-0106312 (filed on Aug. 22, 2017), which are all hereby incorporated by reference in their entirety.

BACKGROUND

The present invention relates to control and management of a door lock, specifically, a method, a system, and a door lock device for controlling a door lock of a door and for controlling and managing the door lock for controlling and managing the door lock by using a smart phone a smart phone.

In general, a door lock system is a device installed at the entrance of a building in which a door is unlocked even when a user enters a password and the door is automatically locked when the user goes out. The digital door lock is designed to unlock the door by password entry, fingerprint recognition, contact or proximity of an electronic key such as a memory card. However, the digital door lock, which is intended to unlock the door by the input of a password, has poor security by entering of the password by pressing numeric keys on a keypad. That is, the password entry may be exposed when there are others around. In addition, depending on the installation location of the keypad, a user may need to bow to enter the numbers. In addition, the digital door lock, which is intended to unlock the door by fingerprint recognition, is inconvenient because the user must touch the finger on a fixed fingerprint input unit. The digital door lock, which is intended to unlock the door by an electronic key, is inconvenient because a user holds the electronic key.

SUMMARY

The problem to be solved by the present invention to solve problems in the related arts is to provide a method, a system, and a digital door lock device for controlling a door lock of a door in which the door is automatically opened through short-range wireless communication between a smart phone and the door lock device when a user only has a registered smart phone, without entering a password by pressing numeric keys on a keypad manually, and without contacting a finger to a fixed fingerprint input unit.

According to the present invention to solve the above-mentioned problems, there is provided a method for controlling a door lock device of a door comprising scanning a signal output from the smart phone by the door lock device and checking whether strength of the scanned signal is greater than a predetermined signal strength, comparing strength of a signal (RSSI) of the smart phone received through an external antenna installed outside the door in which the door lock device is installed with the strength of a signal (RSSI) of the smart phone received through an internal antenna installed inside the door by the door lock device, when the strength of the scanned signal is greater than the predetermined signal strength, authenticating whether the smart phone is a valid smart phone, when the strength of a signal of the smart phone received through the external antenna is more than a predetermined value greater than the strength of a signal of the smart phone received through the internal antenna, and opening the door when the smart phone is authenticated as the valid smart phone according to the authenticated result The scanning a signal output from the smart phone by the door lock device comprises scanning the signal of the smartphone by operating the door lock device as a master when the keypad of the digital door lock device is touched. The scanning a signal output from the smart phone by the door lock device comprises scanning the signal of the smartphone by operating the door lock device as a master when the door lock device recognizes the user's voice signal as a predetermined signal.

The checking whether strength of the scanned signal is greater than a predetermined signal strength comprises checking whether the smart phone of the scanned signal is a registered smart phone; and checking whether the strength of the scanned signal is greater than the predetermined signal strength when the smart phone is the registered smart phone.

The external antenna and the internal antenna may be directional printed type antennas.

One side of a printed circuit board may include a circle or rectangular metal pattern for transmitting and receiving signals, the other side of the printed circuit board may be formed with a ground pattern, and an area of the ground pattern may be greater than an area of the circle or rectangular metal pattern.

The authenticating whether the smart phone is a valid smart phone comprises connecting wirelessly the door lock device and the smart phone; requesting, by the door lock device, an encryption key device to the smart phone; and completing the authentication when the smart phone transmits the encryption key and the encryption key that is input is the same as a registered encryption key.

According to the present invention to solve the above-mentioned problems, there is provided a system for controlling a door lock device of a door comprising a door lock device installed on the door including an external antenna installed outside the door, an internal antenna installed inside the door, and a control unit that controls opening and closing of the door; and a smart phone wirelessly connected to the door lock device, in which the control unit of the door lock device controls to scan a signal output from the smart phone, compare strength of a signal of the smart phone received through the external antenna with strength of a signal of the smart phone received through the internal antenna when strength of the scanned signal is greater than predetermined strength of a signal, authenticate the smart phone when the strength of a signal of the external antenna is equal to or greater than the strength of a signal of the internal antenna by a predetermined value as the compared result, and open the door when the smart phone is a valid smart phone as the authenticated result.

According to the present invention to solve the above-mentioned problems, there is provided a door lock device comprising an external antenna installed outside a door; an internal antenna installed inside the door; and a control unit that controls opening and closing of the door, in which the control unit controls to scan a signal output from a smart phone near the door, compare strength of a signal (RSSI_out) of the smart phone received through the external antenna with strength of a signal (RSSI_in) of the smart phone received through the internal antenna when strength of the scanned signal is greater than predetermined strength of a signal, authenticate the smart phone as a valid smart phone when the strength of a signal of the external antenna is greater than the strength of a signal of the internal antenna by a predetermined value as the compared result, and open the door when the smart phone is the valid smart phone as the authenticated result.

The door lock device may further include a keypad that receives a key input through touch input; and a first BLE communication unit that is wirelessly connected with the smart phone by using low power Bluetooth (BLE), in which the door lock device scans the signal output from the smart phone by being operated as a master when the keypad of the door lock device is touched.

The door lock device may further include a voice recognition unit that receives and authenticates an external voice signal; and a first BLE communication unit that is wirelessly connected with the smart phone by using low power Bluetooth (BLE), in which the door lock device scans the signal output from the smart phone by being operated as a master when the voice recognition unit receives an voice signal of a user and the voice signal matches with a predetermined signal.

The control unit may check whether the smart phone of the scanned signal is a registered smart phone, and may check whether the strength of the scanned signal is greater than the predetermined strength of a signal, when the smart phone is the registered smart phone.

The control unit may enable the door lock device to request an encryption key for the smart phone by connecting wirelessly the door lock device and the smart phone; and complete the authentication when the smart phone transmits the encryption key and the encryption key that is input is the same as a registered encryption key.

According to a method, a system, and a digital door lock device for controlling a door lock of a door according to the present invention, even when a user does not enter manually a password through a keypad at the door, when a user with a registered smart phone is within a certain distance from the door, the door lock device uses an external antenna and an internal antenna to recognize whether the smart phone is inside the door or outside the door. When it is determined that the smart phone is outside the door, the door lock device automatically opens the door by authenticating whether it is the registered smart phone through short-range communication (for example, BLE communication). By doing so, exposure of the password is prevented, and when the user only has the registered smart phone without entering manually the password, the door will open automatically.

In the door opening operation of the smart phone and the digital door lock, a series of door open control procedures in which the door lock device becomes a master by touch of the keypad or voice recognition of the door lock, scans the signal output from the smart phone, determines whether the smart phone is outside the door or in the door when the magnitude of the scanned signal is larger than a certain magnitude, and authenticates the smart phone when it is outside the door, are performed by the door lock device such that it has the effect of reducing the power consumption of the smart phone.

In addition, by measuring the directional antennas outside and inside a door, and measuring and comparing the received signal strengths (RSSI) of the external antenna and the external antenna, a door open function does not work when the smartphone is inside and the door open function works only when the smartphone is outside.

BRIEF DESCRIPTION OF THE DRAWINGS

FIG. 3 shows configurations of embodiments of an external antenna 220 and an internal antenna 230.

FIG. 4 shows a block diagram of a configuration of a system for controlling a door according to another embodiment of the present invention.

DETAILED DESCRIPTION

Figure 1:
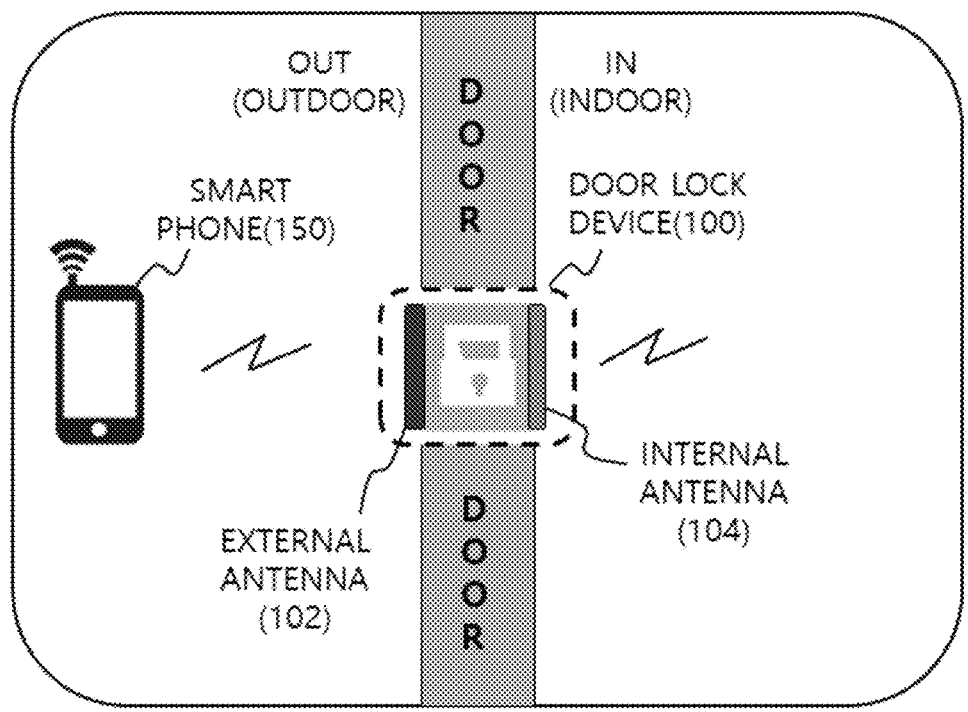
FIG. 1 shows a configuration of a system for controlling a door to which the present invention is applied.

Hereinafter, preferred embodiments of the present invention will be described in detail with reference to the accompanying drawings. The embodiments described in the specification and the configurations shown in the drawings are merely preferred embodiments of the present invention, and the technical spirit of the present invention is described. Not all representations, it should be understood that there may be various equivalents and variations that can be substituted for this application.

FIG. 1 shows a configuration of a system for controlling a door to which the present invention is applied. In the present invention, the door lock device 100 becomes a master through short-range wireless communication between a door lock device 100 installed at a door and recognizes and authenticates a smart phone 150 outside the door and the smart phone 150 such that a door open function of the door lock device 100 is implemented without entering a password on a keypad manually.

That is, when the user is within a certain distance from the door and holds the registered smart phone 150, the door lock device 100 recognizes whether the smart phone 150 is inside the door or outside the door by using an external antenna 102 and an internal antenna 104. When it is determined as being outside the door, the door is automatically opened by authenticating whether it is a registered smart phone through short-range communication (example, BLE communication). This avoids password exposure and provides a convenience that the door is automatically opened when the user has only the registered smart phone without entering passwords manually. In addition, the door lock device as the master controls the operation of door opening function, thereby reducing the power consumption of the smart phone.

Figure 2:
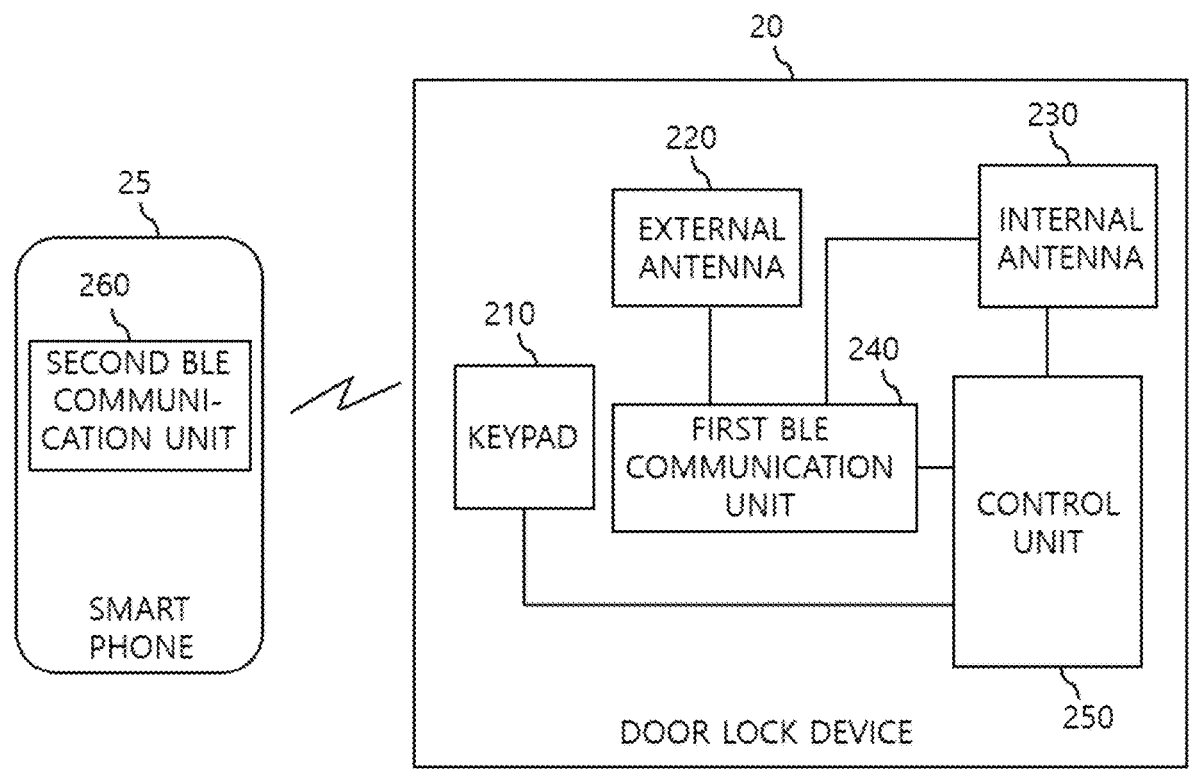
FIG. 2 shows a block diagram of a configuration of the system for controlling a door according to an embodiment of the present invention.

FIG. 2 shows a block of a configuration of the system for controlling a door according to an embodiment of the present invention. The system for controlling a door according to the embodiment of the present invention includes a door lock device 20 and a smart phone 25.

The door lock device 20 includes an external antenna 220 installed outside the door, an internal antenna 230 installed inside the door, a control unit 250 that controls opening and closing of the door, a keypad 210 that receives key inputs through touch input, and a first BLE communication unit 240 that is wirelessly connected to the smart phone 25 by using low power Bluetooth (BLE).

The smart phone 25 includes a second BLE communication unit 260 which is wirelessly connected to the door lock device 20, and wirelessly connected to the door lock device 20 by using the low power Bluetooth (BLE).

The control unit 250 controls the opening and closing of the door, scans a signal output from the smart phone 25, compares the strength of a signal of the smart phone received through the external antenna 220 with the strength of a signal of the smart phone received through the internal antenna 230 when the strength of the scanned signal is greater than the strength of a predetermined signal, authenticates the smart phone 250 when the strength of a signal of the external antenna 220 is greater than the strength of a signal of the internal antenna 230 by a predetermined value based on a result of the comparison, and controls the door to open when it is a valid smart phone as a result by the authentication. When the keypad 210 of the door lock device 20 is touched, the door lock device 20 is operated as a master and scans a signal output from the smart phone 25.

The control unit 250 completes the authentication when the door lock device 20 is wirelessly connected to the smart phone 25, the door lock device 20 requests the encryption key from the smart phone 250, the encryption key is transmitted from the smart phone 25, and the encryption key is a registered encryption key.

FIG. 3 shows configurations of embodiments of the external antenna 220 and the internal antenna 230. With reference to FIG. 3, the external antenna 220 and the internal antenna 230 are directional printed (PRINTED) type antennas. One side of a printed circuit board includes a circle or rectangular metal pattern 310 for transmitting and receiving signals and a guide member 320, and a part of the guide member can be shielded by using a ground pattern 330. The other side of the printed circuit board includes a ground pattern 350, and a power supply terminal 360 for transmitting and receiving electric signals. An area of the ground pattern 350 formed on the other side of the printed circuit board is greater than an area of the rectangular metal pattern 310 formed on the one side of the printed circuit board.

FIG. 4 shows a block diagram of a configuration of a system for controlling a door according to another embodiment of the present invention. The system for controlling a door according to another embodiment of the present invention includes a door lock device 40 and a smart phone 45.

The door lock device 40 is installed at the door, and includes an external antenna 420 installed outside the door, an internal antenna 430 installed inside the door, and the control unit 450 that controls the opening and closing of the door. In addition, the door lock device 40 includes a voice recognition unit 410 that recognizes voice by receiving the voice of human and a first BLE communication unit 440 that is wirelessly connected to the smart phone 45 by using the low power Bluetooth (BLE).

The smart phone 45 includes a second BLE communication unit 460 that is wirelessly connected to the door lock device 40, by using the low power Bluetooth (BLE).

The control unit 450 controls the opening and closing of the door such that a signal output from the smart phone 45 is scanned by operating the door lock device 40 as a master, when the voice recognition unit 410 recognizes voice as a predetermined voice signal. In addition, the control unit 450 scans the signal output from the smart phone 45, and when the strength of the scanned signal is greater than the strength of a predetermined signal, the strength of a signal of the smart phone received through the external antenna 420 and the strength of a signal of the smart phone received through the internal antenna 430 are compared, and the control unit 450 controls to authenticate the smart phone 450 when the strength of a signal of the external antenna 420 is greater than or equal to the strength of a signal of the internal antenna 430 by a predetermined value according to a result of the comparison and to open the door when it is a valid smart phone as a result of the authentication.

The control unit 450 completes the authentication when the door lock device 40 is wirelessly connected to the smart phone 45, the door lock device 40 requests the encryption key for the smart phone 450, and it is determined that the encryption key is a registered encryption key by being transmitted the encryption key from the smart phone 45.

Figure 5A:
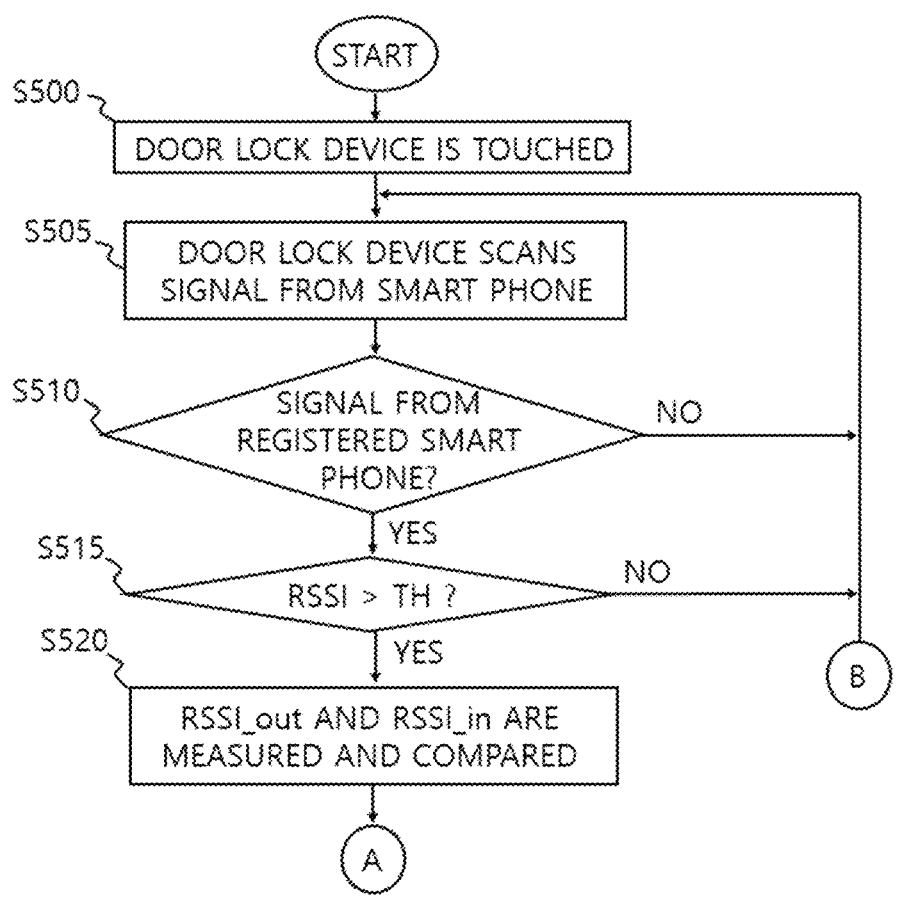
FIG. 5A and FIG. 5B show flowcharts of a method for controlling of a door lock device of a door according to an embodiment of the present invention.
Figure 5B:
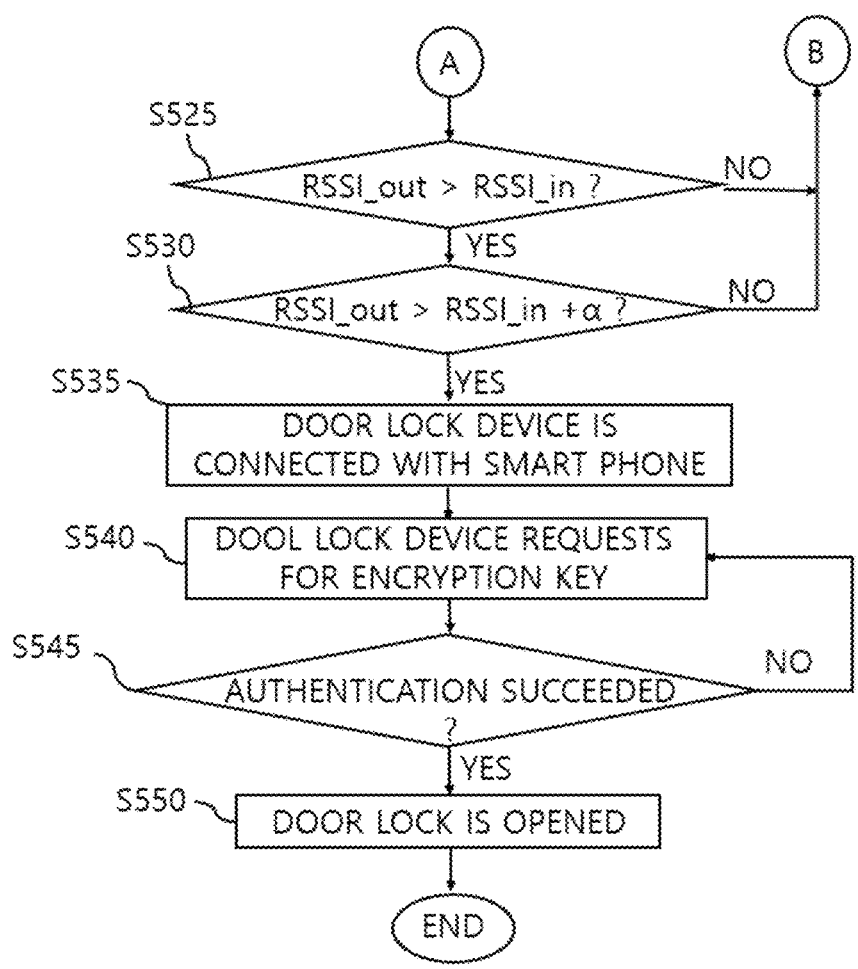

FIG. 5 shows a flowchart of a method for controlling a door lock device of a door according to the embodiment of the present invention. With reference to FIG. 2 to FIG. 5A and FIG. 5B, the method for controlling a door lock device of a door according to the embodiment of the present invention will be described.

In the embodiment of the present invention, the second BLE communication unit 260 corresponding to a BLE communication module transmits signals to peripheral devices at regular intervals when the smart phone mounted is operated in an advertise mode (broadcast mode) of BLE communication. That is, the smart phone becomes an advertiser and outputs periodically an advertising signal.

At this time, when the keypad 210 of the door lock device 20 is touched (S500), the door lock device 20 on which the first BLE communication unit 240 is mounted is operated as the master, and periodically performs scanning to receive the signal periodically transmitted from the smart phone 25, for example, the advertising signal of the BLE communication (S505).

When the signal is scanned, it is possible to check whether or not the scanned signal is the signal output from the registered smart phone (S510). This is to measure and compare RSSI only for the registered smart phones without performing a process of measuring an RSSI value for each scanned signal and comparing the RSSI value through the external antenna 220 and the internal antenna 230. Whether or not it is a registered smart phone can be confirmed by using a smart phone ID included in the scanned advertising signal.

The door lock device 20 checks whether or not the strength of the scanned signal (RSSI) is greater than a predetermined signal strength (TH) when the smart phone is registered while scanning a signal output from the smart phone 25 (S515).

When the scanned signal is the signal output from the registered smart phone and the strength of a signal is greater than or equal to the a predetermined signal strength (TH), the strength of a signal (RSSI_out) of the smart phone 25 received through the external antenna 220 installed outside the door in which the door lock device 20 is installed is compared with the strength of a signal (RSSI_in) of the smart phone received through the internal antenna 230 installed inside the door (S520). For example, the external antenna 220 receives the advertising signal output through the second BLE communication unit 260 of the smart phone 25, and when the strength of a signal (RSSI_out) is greater than a reference value (TH), the advertising signal of the smart phone is received through the internal antenna 230, and the strength of a signal (RSSI_in) through the internal antenna 230 is measured. And then, the strength of a signal of the smart phone (RSSI_out) received through the external antenna 220 is compared with the strength of a signal of the smart phone (RSSI_in) received through the internal antenna 230.

When the strength of a signal of the smart phone received through the external antenna 220 is more than predetermined value greater than the strength of a signal of the smart phone received from the internal antenna 230, it is determined that a user is outside the door and the door lock device 20 establishes a one-to-one connection with the smart phone 25 through the BLE communication (S535).

When they are connected to each other, the door lock device 20 authenticates whether or not the smart phone 25 is a valid smart phone before opening the door. In the embodiment of the present invention, the encryption key is requested for the smart phone (S540). When the smart phone 25 transmits the encryption key to the door lock device 20 and the authentication is succeeded by the encryption key, that is, it is authenticated that the smart phone is valid as a result the authentication, the door lock device 20 controls the door to open (S550). During an authentication process, when the authentication fails by the encryption key, a certain number of retries may be attempted. When the authentication fails even after retrying, the process may be terminated.

However, in the embodiment of the present invention described above, when the keypad 210 of the door lock device 20 is touched, the door lock device 20 operates as the master and starts the scanning for signals of the smart phone. However, in another embodiment of the present invention, when the door lock device 40 receives a voice signal of a user, and when the voice of a user received through the voice recognition unit 410 is recognized as a predetermined signal, the door lock device 40 operates as the master and a signal of the smart phone can be scanned. For example, when the user says "open the door" outside the door, the voice recognition unit 410 recognizes the user's voice, and when it is the voice of the registered user, the door lock device 40 may be a master to start scanning of the advertising signal output from the smart phone 45. Hereinafter, since the signal scanning of the smart phone and the authentication process are the same as in FIG. 2, a detailed description thereof will be omitted.

The present invention may be embodied as a code read by a computer (including all types of devices having information processing function) on a computer readable recording medium. A computer readable recording medium includes all types of stores recording devices in which data that can be read by a computer system is stored. As examples of computer-readable recording devices include a ROM, a RAM, a CD-ROM, a magnetic tape, a floppy disk, and an optical data storage device. In addition, in this specification, a "part" may be a hardware component such as a processor and a circuit, and/or a software component executed by a hardware configuration such as a processor.

Although the present invention has been described with reference to the embodiments shown in the drawings, these are merely exemplary, and those skilled in the art will understand that various modifications and equivalent other embodiments are possible. The true scope of technical protection of the present invention should be defined by the technical spirit of the attached claims.

The present invention is available for a door lock system of the door of a building, and can be particularly useful for controlling and managing a door lock by using a smart phone.

What is claimed is:

1. A method for controlling a door lock device of a door comprising:
    scanning an advertising signal output from a smart phone by the door lock device operating as a master of Bluetooth low energy (BLE) communication, the door lock device installed at the door and communicating with the smart phone through BLE communication;
    checking, by the door lock device, whether the smart phone is registered in the door lock device, by using a smart phone ID included in the scanned advertising signal;
    checking, by the door lock device, whether strength of the scanned advertising signal is greater than a predetermined signal strength, when the smart phone is registered as a result of the checking;
    comparing, by the door lock device, a strength of a signal RSSI out of the smart phone received through an external antenna installed outside the door in which the door lock device is installed with a strength of a signal RSSI in of the smart phone received through an internal antenna installed inside the door, when the strength of the scanned advertising signal is greater than the predetermined signal strength;
    authenticating whether the smart phone is a valid smart phone, when the strength of the signal RSSI out of the smart phone received through the external antenna is greater than the strength of the signal RSSI in of the smart phone received through the internal antenna by a certain value RSSI diff or more; and
    opening the door when the smart phone is authenticated as the valid smart phone based on a result of the authenticating,
    wherein the door lock device includes a first BLE communication unit for performing BLE communication with the smart phone, the smart phone includes a second BLE communication unit for performing BLE communication with the door lock device, and the door lock device is wirelessly connected to the smart phone using BLE communication,
    wherein each of the external antenna and the internal antenna is a planar antenna having directivity, the planar antenna having a metal pattern on one side and a ground pattern on another side, an area of the ground pattern is larger than an area of the metal pattern, and the directivity is toward the outside of the door, and the external antenna shares the first BLE communication unit with the internal antenna, and
    wherein a difference RSSI diff between values of the signal RSSI out and the signal RSSI in is a difference in signal strength corresponding to a distance at which the smart phone is determined to be located outside the door.

2. The method for controlling the door lock device of the door according to claim 1, wherein the scanning a signal output from the smart phone by the door lock device comprises scanning the signal of the smartphone by operating the door lock device as a master when a keypad of the door lock device is touched.

3. The method for controlling the door lock device of the door according to claim 1, wherein the scanning a signal output from the smart phone by the door lock device comprises scanning the signal of the smartphone by operating the door lock device as a master when the door lock device recognizes a user's voice signal as a predetermined signal.

4. The method for controlling the door lock device of the door according to claim 1, wherein the authenticating whether the smart phone is a valid smart phone comprises:
    connecting wirelessly the door lock device and the smart phone each other;
    requesting, by the door lock device, an encryption key to the smart phone; and
    completing the authentication when the smart phone transmits the encryption key to the door lock device and the transmitted encryption key is same as a registered encryption key.

5. A system for controlling a door comprising:
    a door lock device installed on the door and operating as a master of Bluetooth low energy (BLE) communication, comprising an external antenna installed outside the door, an internal antenna installed inside the door, and a control unit that controls opening and closing of the door; and a smart phone wirelessly connected to the door lock device using the BLE communication, wherein the control unit of the door lock device scans an advertising signal output from the smart phone, checks whether the smart phone is registered in the door lock device by using a smart phone ID included in the scanned advertising signal, checks whether strength of the scanned advertising signal is greater than a predetermined signal strength when the smart phone is registered as a result of the checking, compares strength of a signal RSSI out of the smart phone received through the external antenna installed outside the door in which the door lock device is installed with a strength of a signal RSSI in of the smart phone received through an internal antenna installed inside the door, when strength of the scanned advertising signal is greater than predetermined signal strength, authenticates whether the smart phone is a valid smart phone when the strength of the signal RSSI out of the smart phone received through the external antenna is greater than the strength of the signal RSSI in of the smart phone received through the internal antenna by a certain value RSSI diff or more, and opens the door when the smart phone is authenticated as the valid smart phone based on a result of the authenticating, wherein the door lock device includes a first BLE communication unit for performing BLE communication with the smart phone, and the smart phone includes a second BLE communication unit for performing BLE communication with the door lock device, wherein each of the external antenna and the internal antenna is a planar antenna having directivity, the planar antenna having a metal pattern on one side and a ground pattern on another side, an area of the ground pattern is larger than an area of the metal pattern, and the directivity is toward the outside of the door, and the external antenna shares the first BLE communication unit with the internal antenna, and wherein a difference RSSI diff between values of the signal RSSI out and the signal RSSI in is a difference in signal strength corresponding to a distance at which the smart phone is determined to be located outside the door.

6. A door lock device comprising:

an external antenna installed outside a door and having directivity toward the outside of the door;

an internal antenna installed inside the door and having directivity toward the outside of the door;

a keypad for receiving a key input through a touch input;

a first BLE communication unit that is wirelessly connected with a smart phone by using Bluetooth low energy (BLE) communication; and a control unit that controls opening and closing of the door, wherein the control unit scans an advertising signal output from the smart phone by being operated as a master when the keypad of the door lock device is touched, checks whether the smart phone is registered in the door lock device by using a smart phone ID included in the scanned advertising signal, checks whether strength of the scanned advertising signal is greater than a predetermined signal strength when the smart phone is registered as a result of the checking, compares a strength of a signal RSSI out of the smart phone received through the external antenna installed outside the door in which the door lock device is installed with strength of a signal RSSI in of the smart phone received through an internal antenna installed inside the door, when strength of the scanned advertising signal is greater than predetermined signal strength, authenticates whether the smart phone is a valid smart phone when the strength of the signal RSSI out of the of the smart phone received through the external antenna is greater than the strength of the signal RSSI in of the smart phone received through the internal antenna by a certain value RSSI diff or more, and opens the door when the smart phone is authenticated as the valid smart phone based on a result of the authenticating, wherein each of the external antenna and the internal antenna is a planar antenna having directivity, the planar antenna having a metal pattern on one side and a ground pattern on another side, an area of the ground pattern is larger than an area of the metal pattern, and the directivity is toward the outside of the door, and the external antenna shares the first BLE communication unit with the internal antenna, and wherein a difference RSSI diff between values of the signal RSSI out and the signal RSSI in is a difference in signal strength corresponding to a distance at which the smart phone is determined to be located outside the door.

* * * * *